United States Patent [19]
Simon, Jr.

[11] Patent Number: 5,521,632
[45] Date of Patent: May 28, 1996

[54] ADAPTOR FOR USE IN VIDEO MICROSCOPE SYSTEMS

[76] Inventor: John O. Simon, Jr., 288 Long Pond Rd., Hewitt, N.Y. 07421

[21] Appl. No.: 259,990

[22] Filed: Jun. 15, 1994

[51] Int. Cl.$^6$ .................................................. H04N 7/18
[52] U.S. Cl. ........................ 348/79; 348/335; 348/360; 359/368; 359/894
[58] Field of Search .................................. 359/368, 369, 359/894; 348/335, 360, 79; H04N 7/18

[56] References Cited

U.S. PATENT DOCUMENTS

| | | |
|---|---|---|
| 926,970 | 7/1909 | Watkins et al. . |
| 2,845,842 | 8/1968 | Leitz et al. . |
| 3,417,685 | 12/1968 | Kato et al. . |
| 3,525,803 | 8/1970 | Smart . |
| 4,115,802 | 9/1978 | Kramer et al. . |
| 4,302,087 | 11/1981 | Reinheimer et al. . |
| 4,639,772 | 1/1987 | Sluyter ........................................ 348/73 |
| 4,807,594 | 2/1989 | Chateneuer ............................. 359/894 |
| 4,829,374 | 5/1989 | Miyamoto et al. . |
| 5,004,332 | 4/1991 | Edwards ................................... 359/368 |
| 5,006,872 | 4/1991 | Parker ........................................ 348/79 |
| 5,138,486 | 8/1992 | Meyer et al. . |
| 5,235,459 | 8/1993 | Meyer et al. . |

FOREIGN PATENT DOCUMENTS 855205  5/1940  France .

OTHER PUBLICATIONS

Leitz Sci. & Tech. Inf. (Germany) vol. 7, No. 6 (Jun. 1979) pp. 199–204.
John O. Simon Instrument Co., Inc., Video Microscope & Video Macroscope System Marketing Brochure, 1986.

Primary Examiner—Howard W. Britton
Attorney, Agent, or Firm—Dara L. Onofrio; Ostrager, Chong & Flaherty

[57] ABSTRACT

An adaptor for use in a video microscope system including a video monitor, a camera and a microscope. The adaptor comprises a hollow body portion including open top and bottom ends, said body portion having an interior surface; first means for coupling said top end to the camera; and second means for coupling said bottom end to the microscope. The microscope includes a base portion having a top surface opening and objective lens; wherein the bottom end of the adaptor is coupled to the top surface opening of the microscope. The adaptor transmits light directly from the objective lens to the camera without changing the direction of the light. The adaptor fits conventional and infinity corrected microscopes to convert the microscopes into dedicated video microscope systems. The video monitor is connected to the system to provide presentation of microscope object images to a group of observers. The system may additionally be interfaced with a computer system to add text and save images.

31 Claims, 4 Drawing Sheets

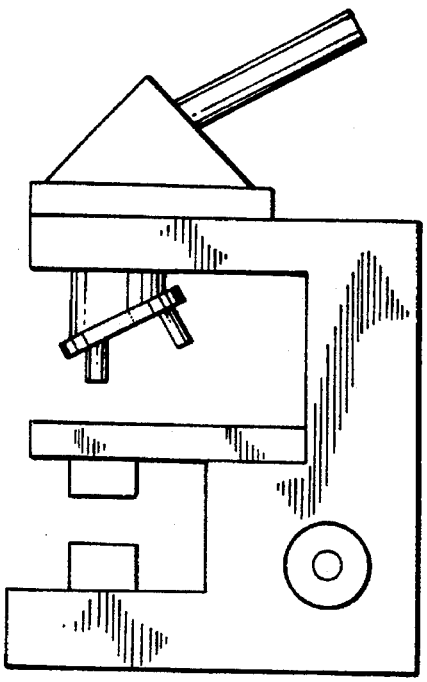
FIG. 2A
PRIOR ART
MICROSCOPE WITH PRISM BODY
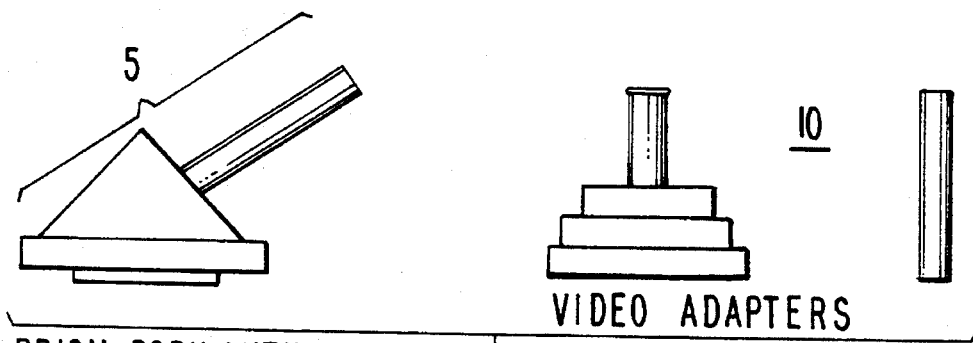
PRISM BODY WITH OCULARS
VIDEO ADAPTERS
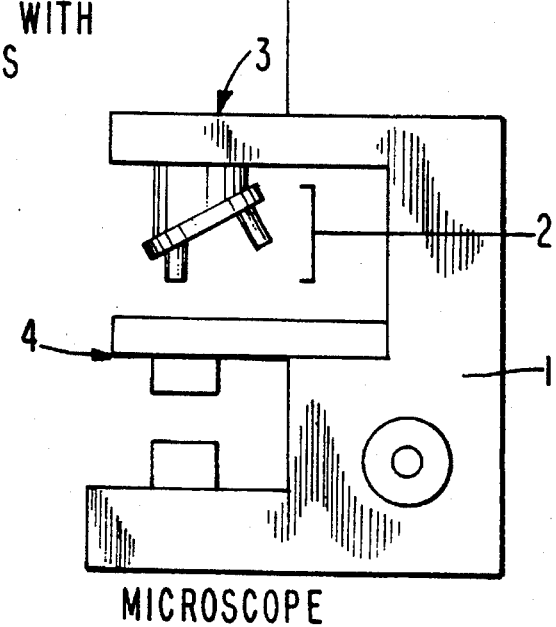
FIG. 2B
MICROSCOPE

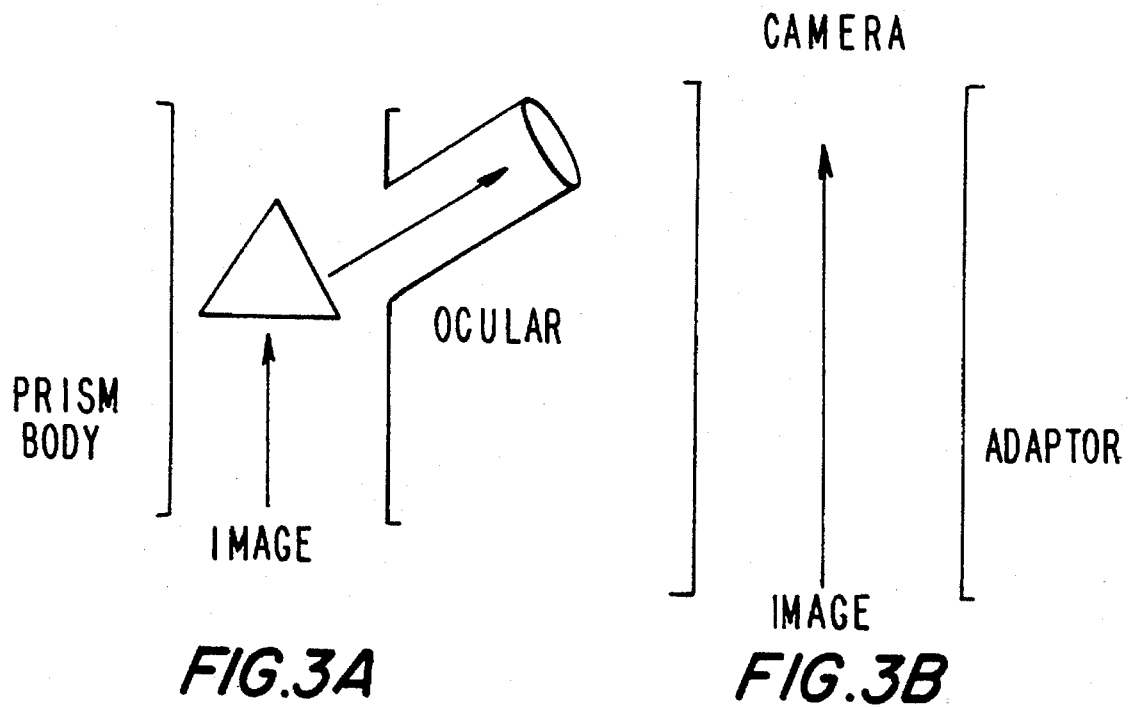
FIG.3A  FIG.3B
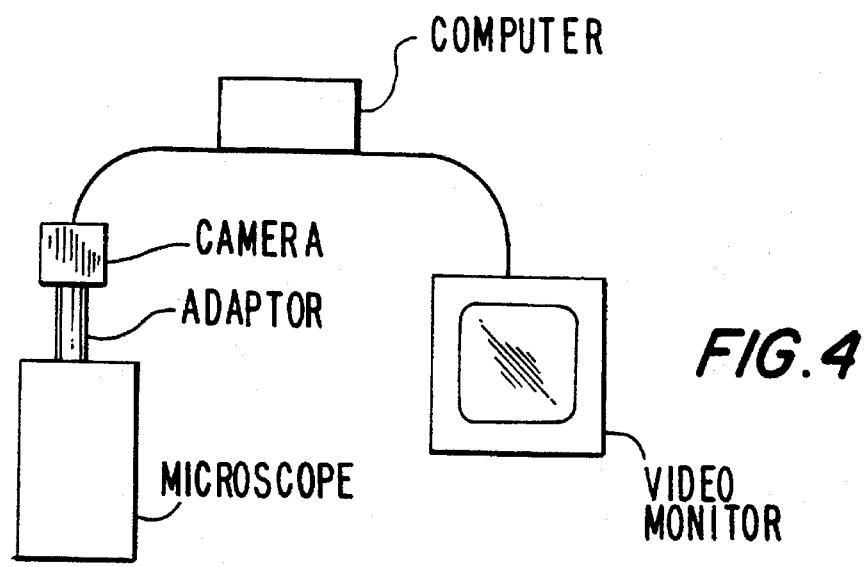
FIG.4

ADAPTOR FOR USE IN VIDEO MICROSCOPE SYSTEMS

FIELD OF INVENTION

This invention generally relates to video microscope systems. More specifically, the invention concerns an adaptor for use in combination with a camera, video monitor and a microscope in dedicated video microscope systems without the presence of a prism body.

BACKGROUND ART

Microscope systems including a camera and adaptors for attaching such devices to a microscope are known. For example, U.S. Pat. No. 926,970 to Watkins discloses a photographic apparatus for use in connection with a microscope. Telescoping tubes are provided to adjust the distance between the camera and the object under view. The object under the scope is focused through an eyepiece.

U.S. Pat. No. 2,845,842 to Leitz et al. discloses a microphotographic apparatus for examining objects with one or both ocular pieces. Attachments are provided for placing a camera on top of the scope. Focusing of the objects are through the ocular unit.

U.S. Pat. No. 4,302,087 to Reinheimer et al. discloses an attachment camera for microscopes. A camera holder, with an internal photographic ocular, is a tube positioned between the attachment camera and the binocular tube.

These microscope systems incorporate a camera for photographing an image under the microscope and provide for focusing of objects through an ocular piece. They have limited application for teaching applications or simultaneous viewing of microscope object images by a group of observers. To overcome this limitation the prior art has shown inclusion of video cameras and video monitors in microscope systems.

Video microscope systems generally include a microscope, a video camera coupled to the microscope and a video monitor. The video monitor is utilized for presentation of microscope object images to a group of observers. Video microscopy systems offer an advantage in teaching applications by providing the capability of using a pointer and results in more effective communication since all observers are simultaneously viewing the same image.

U.S. Pat. No. 3,525,803 to Smart discloses an apparatus and method for detecting malignant cells using two microscopes connected to tv cameras and display screens. The tv cameras scan the microscope images and combine signals from under the two scopes onto a display screen.

U.S. Pat. No. 4,829,374 to Miyamoto et al. discloses a surface inspection apparatus including a microscope and tv camera. The tv camera 12 is mounted on top of the lens barrel of the microscope. The system provides a means for automatically focusing objects under the microscope.

U.S. Pat. Nos. 5,138,486 and 5,235,459 to Meyer et al. disclose microscopes. An ocular attachment and an auxiliary port are provided on the microscope for a tv camera.

Other prior art microscope systems are disclosed in U.S. Pat. No. 4,115,802 to Kramer et al. which discloses an apparatus and process for observing living specimens under a microscope using light optical means. Focusing of the object is through an ocular piece. U.S. Pat. No. 3,417,685 to Jinichi Kato et al. discloses a stereoscopic photographing device which uses an optical path changer, i.e. prism. U.S. Pat. No. 5,006,872 to Parker illustrates a video camera support system wherein the video camera is secured to an adjustable beam for easy transport to different microscopes. French Patent No. 855,205 discloses a microscope with attachment 31 which fits into the top of the microscope at a diagonal angle to the ocular piece.

Thus the prior art has shown that various components including a camera, a video monitor and adaptors for attaching such devices to a microscope are known. However, in the prior art systems a prism body is generally present which changes the direction of light transmitted from the microscope objective lens so that images are observed through an ocular piece. In addition, in adaptors for microscope attachments that fit on top of the ocular piece are typically unbalanced and unstable.

As an alternative, systems in which the prism body is eliminated incorporate multiple attachments, such as a separate tube and separate means for attaching the tube to the microscope body. These multiple attachments are not entirely satisfactory in that they are limited for use on a specific microscope body. The structure of the present video adaptor is a single unitary structure which fits directly onto the microscope body and permits light to be transmitted directly from the objective lens of the microscope to the camera without changing direction. Images are viewed on the video monitor. The adaptor fits conventional or infinity corrected microscopes to produce dedicated video microscope systems. Further advantage over the prior art is in the production of par-focal images on the video monitor of objects placed under the objective lenses of the microscope.

Accordingly, it is a broad object of the present invention to provide an adaptor, which does not change the direction of light, for use in combination with a camera, video monitor and a microscope in a video microscope system.

A more specific object of the invention is to provide an adaptor comprising a hollow body portion including open top and bottom ends and an interior surface; a first means for coupling the top end to a camera and a second means for coupling the bottom end to a microscope.

Another more specific object of the invention is to provide an adaptor that fits conventional and infinity corrected microscopes and enables a variety of dedicated video systems to be produced.

Another more specific object of the invention is to provide an adaptor which permits production of par-focal images on the video monitor of objects placed under the objective lens of the microscope.

Another specific object of the invention is to provide video microscope systems which are more stable than the prior art conventional systems.

Another more specific object of the invention is to provide video microscope systems where the design of the adaptor proportionally distributes the weight of the components of the system, in particular the camera body, to produce a stable, balanced system.

Another object of the invention is to provide a video microscope system for teaching applications whereby the video monitor presents microscope object images to a group of observers.

A further object of the invention is to interface the video microscope system with a computer system to save images displayed and to add text to the images.

DISCLOSURE OF THE INVENTION

In the present invention, these purposes, as well as others which will be apparent, are achieved generally by providing an adaptor for use in combination with a camera, video monitor and a microscope in a video microscope system.

The adaptor comprises a hollow body portion including top and bottom ends, said body portion having an interior surface; first means for coupling the top end to a camera and second means for coupling the bottom end to a microscope.

The hollow body is preferably a tube having a circumferential interior surface. The exterior surface of the tube may be cylindrical in shape or of any other shape or design, however, in all embodiments, it is preferred that the interior surface remain circumferential.

The height of the tube is in the range of 25.3 to 253 mm and the diameter of the interior surface is in the range of 15 to 32 mm. The interior surface may be the same diameter throughout the body portion or may vary depending on the height of the adaptor and whether a lens is present within the adaptor. For example, in an embodiment of the adaptor the diameter of the interior surface at the bottom end may be greater than the diameter of the interior surface at the top end. In all embodiments the configuration of the adaptor, in particular the height of the hollow body and the interior diameter, is designed to eliminate the need for the presence of a prism body which is required to focus and view objects in a microscope. The height of the adaptor in the video microscope systems is critical for proper focusing of object images. The adaptor is designed so that the distance between the objective lens of the microscope and the position of the camera on the adaptor permits proper focusing.

The adaptor may be made of a variety of materials including metals, phenolic materials or polymeric materials. Preferably anodized aluminum is used.

The particular structure of the adaptor enables coupling with both conventional and infinity corrected microscopes. The adaptor may also further comprise a lens attached to the interior surface. In applications where the microscope is a conventional microscope, the lens is optional, however if a lens is present it generally is a reduction lens. In applications where the microscope is an infinity corrected microscope the lens is both a telescoping and reduction lens. The telescoping function is incorporated due to the difference in the objective lens of the infinity corrected microscopes.

The adaptor further permits production of par-focal images on the video monitor of objects placed under the objective lens. This enables images to be viewed by a group of observers on the video monitor under different magnifications without the need for refocusing.

Other objects features and advantages of the present invention will be apparent when the detailed description of the preferred embodiments of the invention are considered in conjunction with the drawings, which should be construed in an illustrative sense.

BRIEF DESCRIPTION OF THE DRAWINGS

FIG. 2A is a diagrammatic illustration of a microscope including a prism body;

FIG. 2B is a diagrammatic illustration of a microscope and component parts and the adaptors of the invention;

FIG. 3A is a diagrammatic illustration of the path of light in a microscope including a prism body;

FIG. 3B is a diagrammatic illustration of the path of light using the adaptors of the invention;

FIG. 4 is a diagrammatic illustration of the video microscope system of the invention.

BEST MODE OF CARRYING OUT THE INVENTION

Figure 1:
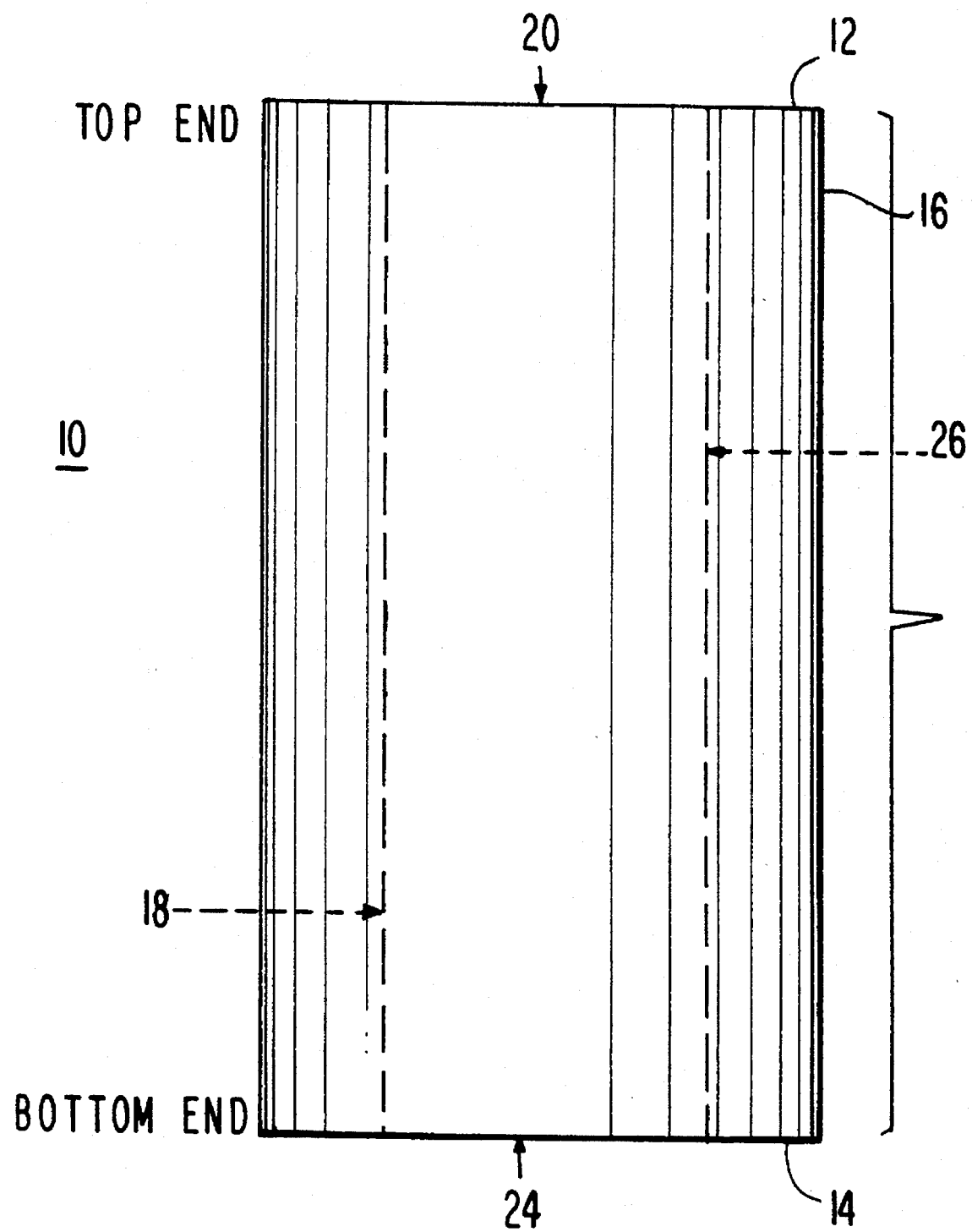
FIG. 1 is an illustration of the invention adaptor.

With reference to the drawings, FIG. 1 is an illustration of the general structure of the video adaptor 10 of the invention. The adaptor is used in combination with a camera, video monitor and microscope in a video microscope system. The adaptor comprises a hollow body portion 16 including top 12 and bottom 14 ends and an interior surface 26; a first means for coupling the top end to the camera 20 and a second means for coupling the bottom end to the microscope 24. The adaptor is a single unitary structure which fits directly onto the microscope body and permits; light to be transmitted directly from the objective lens of the microscope to the camera without changing direction.

The adaptors of the invention fit both conventional microscopes and infinity corrected microscopes. Such microscopes are generally commercially available from American Optical, Cambridge Instruments and Reichert-Jung, (all three manufacturers) at P.O. Box 123, Buffalo, N.Y., 14240 or Leica, Inc., 3362 Walden Avenue, Depew, N.Y. Use of the invention adaptor, however, is not limited to the microscopes from these manufacturers.

In a conventional microscope the distance between the lens in the eyepiece and the objective lens in the nosepiece is constant. Focusing of images placed on the microscope stage is accomplished by moving the stage up and down thus the object itself is moved into focus and the focal distance doesn't change. In an infinity corrected microscope ("ICM") the distance between the lens in the eyepiece and the objective lens is variable. Focusing of images is accomplished through the nosepiece. The objective lens on the nosepiece moves ups and down until the image comes into focus thus the focal distance is constantly changing. The objective lenses present in conventional and ICM microscopes are slightly different due to this distinction.

In both conventional and ICM microscopes a prism body is required to focus objects through the eyepiece. The configuration of the adaptor is designed to eliminate the need for the presence for a prism body. FIG. 2A is a diagrammatic illustration of a microscope including a prism body portion. FIG. 2B is a diagrammatic illustration of a microscope and component parts as well as embodiments of the adaptors of the invention. As shown in FIG. 2B the microscope consists of a prism body portion, including ocular piece 5 and a base portion 1 having a top surface opening 3 and objective lenses 2 on the nosepiece. The prism body portion 5 fits into the top surface opening 3 as shown in FIG. 2A. The bottom end of the adaptors of the invention also fit directly into the top surface opening of the microscope. Objects for viewing are placed on the stage 4.

As used in the specification herein, the term prism body is used to refer to any means for changing the direction of light from the microscope objective lens. As illustrated in FIG. 3A the path of light in a microscope including a prism body is bent towards the ocular piece so that the image is viewed through the eyepiece. In contrast, as shown in FIG. 3B, the use of the adaptor of the invention permits light to be transmitted directly from the objective lens of the microscope to the camera without changing the direction of the light. The distance between the objective lens of the microscope and the position of the camera on the adaptor is critical for proper focusing of object images on the video monitor. The adaptor is designed such that the camera chip inside the camera body receives the focused images and transmits the image via video signals to the video monitor for display.

The hollow body portion of the adaptor is preferably a tube having a circumferential interior surface. The exterior surface of the tube may be cylindrical in shape or of any other shape or design, however, in all embodiments, it is preferred that the interior surface remain circumferential.

The height of the tube is in the range of 25.4 to 253 mm. For use on infinity corrected microscopes the length of the tube is preferably 90 to 120 mm. The diameter of the interior surface is in the range of 15 to 32 mm. The interior surface may be the same diameter throughout the body portion or may vary depending on the height of the adaptor and whether a lens is present within the adaptor body. For example, in an embodiment of the adaptor the diameter of the interior surface at the bottom end may be greater than the diameter of the interior surface at the top end.

The adaptor may be made of a variety of materials selected from the group consisting of metals, phenolic materials or polymeric materials. Preferably anodized aluminum is used. The adaptor tube is preferably made of light weight materials and is designed to distribute the weight of the camera body attached at the top end of the adaptor. The particular design of the adaptor provides greater stability to the complete video microscope systems than conventional prior art systems. For example, in the prior art systems, adaptors fit on top of the prism body or ocular piece and the camera is then placed on top of the adaptor creating an unbalanced and unstable system.

The adaptor may further include a lens 18 attached to the interior surface of the hollow body. Applications where the adaptor is used on a conventional microscope the lens is a typically a reduction lens. A reduction lens provides transmission of an image which utilizes the full numerical aperture of the objective lens. Thus this lens reduces magnification of images for transmission of the full image to the camera chip. In applications where the adaptor is used on an infinity corrected microscope the lens is both a telescoping and reduction lens. The telescoping lens bends parallel light waves so that the full image of the objective lens is transmitted onto the camera chip. This "bending" of light is not a change in the direction of the light. The lenses used in the adaptor are conventional lenses which are commercially available from Rolyn Optics Company, 706 Arrowgrand Circle, Covian, Calif. The lens has a diameter in the range of 15 to 30 mm, preferably approximately 20 mm. The lens is generally positioned at 8 to 15 mm from the bottom end of the adaptor.

FIG. 4 is a diagrammatic illustration of the video microscope system of the invention. In general, the adaptor of the invention is used to combine a microscope, camera and video monitor. Objects placed on the microscope are transmitted through the camera and are observed on the video monitor. Typically, the video monitor is connected to the video system through the camera.

The camera used in the invention systems is a closed circuit television camera capable of producing a video signal. The camera includes a camera chip inside the camera body which receives the focused images placed under the objective lens of the microscope and transmits via video signals to the video monitor for display. The position of the camera chip is critical for the proper focusing of the images placed under the objective lens. The camera chip is located over the opening of the top end of the adaptor. The height of the adaptor which is in the range of 25.4 to 253 mm provides that the camera chip is the proper distance from the objective lens. If the adaptor is too long the images may not be par-focal at the next objective lens and if the adaptor is too short there may be no image at all.

In a preferred embodiment the first means includes external screw threads disposed on the top end of the body portion of the adaptor so that the camera screws into the threads securely. The screw threads are generally 32 threads per inch with a inch diameter. Other means may be used to couple the camera to the adaptor.

The video monitor is connected to the camera by a wire or similar means to display an image placed under the objective lens. The ICM microscope includes a nosepiece for focusing an object. Object images can be focused using the microscope nosepiece while viewing said image on the video monitor or in a conventional microscope by adjusting the stage up and down. Fine tuning of the object image can be made by controls on the video monitor. The adaptor permits production of par-focal images on the video monitor of objects placed under said objective lenses.

The video microscope system may further include connection to a camera for taking photographs of object images observed on the video monitor. A computer system can be interfaced with the video microscope system to allow the user to save images and add text to the images displayed on the video monitor. Additionally a video printer or video cassette recorder may also be included in the system.

The adaptors of the invention provide a unique means for coupling to the microscope body. In a preferred embodiment the second means comprises an open ended frusto-conical section extending from said bottom end of said hollow body. The frusto-conical section has inward, outward and side edges oriented on said hollow body such that said inward edge extends from said bottom end of said hollow body and said side edge slants downward from said inward edge toward said outward edge. The outward edge fits directly into said top surface opening of said base portion of the microscope.

The inward edge has a circumferential interior diameter in the range of 15 to 32 mm and said outward edge has a circumferential exterior diameter in the range of 20 to 80 mm. The side edge has a height in the range of 15 to 65 mm and preferably slants downward to form an angle of at least 45° between said inward edge and said outward edge.

This particular configuration enables the adaptor to fit snugly into the top surface opening of ICM and conventional microscopes. Thus allowing for a variety of dedicated video systems to be created. The adaptor may be further secured to the microscope base by providing a screw on the side of the adaptor which once the adaptor is in place on the microscope body can be tightened to further hold the adaptor in place.

Figure 5:
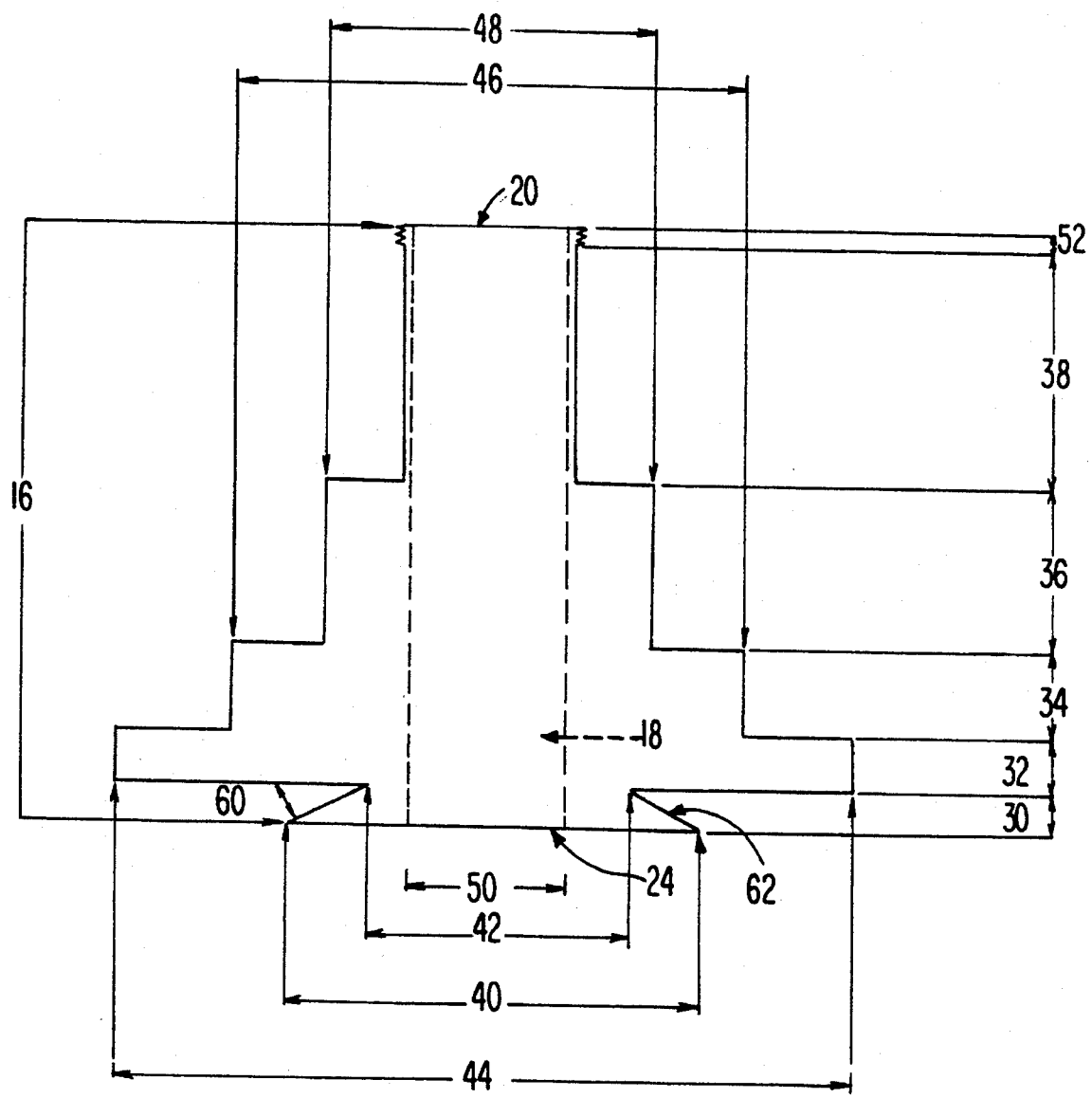
FIG. 5 illustrates an embodiment of the invention adaptor.

Finally, FIG. 5 illustrates a preferred embodiment of the adaptor of the invention. The height of the adaptor 16 is between 76.9–111.1 mm, more preferably between 90–105 mm. The outer portion of the body is graduated and has the following particular dimensions: 44 has a diameter in the range of 70–80 mm, 46 has a diameter in the range of 55–65 mm, 48 has a diameter in the range of 38–47 mm; 30 has a height in the range of 5.4–6.6 mm; 32 has a height in the range of 3.0–10 mm; 34 has a height in the range of 10–18 mm; 36 has a height in the range of 15–26 mm; 38 has a height in the range of 40–46 mm.

The diameter of the interior surface 50 is in the range of 20–32 mm. More preferred the diameter of the interior surface at the bottom end is approximately 30–32 mm and at the top end is approximately 20–25 mm. A lens 18 is positioned at 8 to 15 mm from said bottom end.

The first means for coupling the adaptor to the camera are screw threads 52 approximately 3.5–4.5 mm high.

The second means for coupling the adaptor to the microscope body includes outward edge 44 having a diameter in the range of 40–60 mm; inward edge 42 having a diameter in the range of 28–32 mm; side edge 62 having a length in the range of 44–50 mm and at an angle of approximately 60° between the inward edge and the outward edge.

From the foregoing, it will be appreciated that the invention achieves the objects stated heretofore. An adaptor is provided that fits directly onto a variety of microscopes. Advantage over a known microscope systems is obtained by the invention by providing an adaptor for use in a video microscope system without the presence of a prism body. Focusing and viewing of objects is through the video monitor.

It will be recognized by those skilled in the art that the apparatus of the invention has wide application and in particular in teaching applications wherein the video microscope systems provide microscope object images that can be observed simultaneously by a group of observers.

Numerous modifications are possible in light of the above disclosure. For example, interfacing the invention systems with computer systems, video printers or VCR's. Similarly, although preferred coupling means are described, it will be recognized that other means may be employed to attach the adaptor to the camera, microscope and video monitor together.

Therefore, it is to be understood that although preferred embodiments of the invention have been described, numerous modifications and variations are possible within the principles of the invention. All such embodiments, modifications and variations are considered to be within the spirit and scope of the invention as defined in the claims appended hereto.

I claim:

1. An adaptor for use in combination with a camera, video monitor and a microscope in a video microscope system, the microscope includes a base portion having a top surface opening and objective lens, the adaptor consisting essentially of:

a hollow body portion including open top and bottom ends, said body portion having an interior surface and includes a lens attached to said interior surface;

first means for coupling said top end to the camera; and second means for coupling said bottom end to the top surface opening of the microscope;

such that the adaptor transmits light directly from the objective lens to the camera without changing the light direction.

2. An adaptor according to claim 1, wherein said hollow body is comprised of materials selected from the group consisting of metals, phenolic materials or polymeric materials.

3. An adaptor according to claim 1, wherein said hollow body is comprised anodized aluminum.

4. An adaptor according to claim 1, wherein the microscope is a conventional microscope and said lens is a reduction lens.

5. An adaptor according to claim 1, wherein the microscope is an infinity corrected microscope and said lens is a telescoping and reduction lens.

6. An adaptor according to claim 1, wherein said lens has a diameter in the range of 15 to 30 mm and is positioned at 8 to 15 mm from said bottom end.

7. An adaptor according to claim 1, wherein said first means includes external screw threads disposed on said top end of said body portion so that the camera screws into said threads.

8. An adaptor according to claim 1, wherein the video monitor is connected to the camera to display an image placed under said objective lens.

9. An adaptor according to claim 1, wherein a computer is connected to the video microscope system.

10. An adaptor according to claim 1, wherein the adaptor permits production of par-focal images on the video monitor of objects placed under said objective lenses.

11. An adaptor according to claim 1, wherein the camera is a closed circuit television camera including a camera chip for transmitting an image placed under said objective lens.

12. An adaptor according to claim 11, wherein said camera chip is located over the opening of said top end of the adaptor.

13. An adaptor according to claim 1, wherein said hollow body portion is a tube having a circumferential interior surface.

14. An adaptor according to claim 13, wherein the height of said tube is in the range of 25.3 to 253 mm.

15. An adaptor according to claim 13, wherein the diameter of said interior surface is in the range of 15 to 32 mm.

16. An adaptor according to claim 1, wherein said second means comprises an open ended frusto-conical section extending from said bottom end of said hollow body;

said frusto-conical section having inward, outward and side edges oriented on said hollow body such that said inward edge extends from said bottom end of said hollow body and said side edge slants downward from said inward edge toward said outward edge;

wherein said outward edge fits into said top surface opening of said base portion of the microscope.

17. An adaptor according to claim 16, wherein said inward edge has a circumferential interior diameter in the range of 15 to 32 mm and said outward edge has a circumferential exterior diameter in the range of 20 to 80 mm.

18. An adaptor according to claim 16, wherein said side edge has a height in the range of 15 to 65 mm.

19. An adaptor according to claim 16, wherein said side edge slants downward to form an angle of at least 45° between said inward edge and said outward edge.

20. A video microscope system comprising:

a video monitor;

a camera including means for connecting to said video monitor;

a microscope including a base portion having a top surface opening and objective lens; and an adaptor consisting essentially of a hollow body portion including open top and bottom ends, said body portion having an interior surface and includes a lens attached to said interior surface;

wherein said adaptor has a first means for coupling said top end to said camera and a second means for coupling said bottom end to said top surface opening of said microscope;

such that said adaptor transmits light directly from said objective lens to said camera without changing the light direction.

21. A video microscope system according to claim 20, wherein said microscope is a conventional microscope in which the distance from said objective lens to said camera is constant; and said lens attached to said interior surface is a reduction lens.

22. A video microscope system according to claim 20, wherein said microscope is an infinity corrected microscope in which the distance from said objective lens to said camera is variable; and said lens attached to said interior surface is a telescoping and reduction lens.

23. A video microscope system according to claim 20, wherein said first means includes external screw threads disposed 24. A video microscope system according to claim 20, wherein said video monitor is connected by a wire to said camera to display an image placed under said objective lens.

25. A video microscope system according to claim 20, wherein a computer is connected to the video microscope system.

26. A video microscope system according to claim 20, wherein said second means comprises an open ended frusto-conical section extending from said bottom end of said hollow body;

said frusto-conical section having inward, outward and side edges oriented on said hollow body such that said inward edge extends from said bottom end of said hollow body and said side edge slants downward from said inward edge toward said outward edge;

wherein said outward edge fits into said top surface opening of said base portion of said microscope.

27. A video microscope system according to claim 20, wherein the adaptor permits production of par-focal images on the video monitor of objects placed under said objective lenses.

28. A video microscope system according to claim 20, wherein said camera is a closed circuit television camera including a camera chip for transmitting an image placed under said objective lens.

29. A video microscope system according to claim 28, wherein said camera chip is located over the opening of said top end of the adaptor. on said top end of said adaptor so that said camera screws into said threads.

30. An adaptor for use in combination with a camera, video monitor and a microscope in a video microscope system, the microscope includes a base portion having a top surface opening and objective lens, the adaptor consisting essentially of:

a hollow body portion including open top and bottom ends, said body portion having a circumferential interior surface with a diameter in the range of 15 to 32 mm and includes a lens attached to said interior surface, positioned at 8 to 15 mm from said bottom end;

first means for coupling said top end to the camera which is a closed circuit television camera including a camera chip for transmitting an image placed under said objective lens; wherein said first means includes external screw threads disposed on said top end of said body portion so that the camera screws into said threads; and second means for coupling said bottom end to the top surface opening of the microscope; wherein said second means comprises an open ended frusto-conical section extending from said bottom end of said hollow body;

said frusto-conical section having inward, outward and side edges oriented on said hollow body such that said inward edge extends from said bottom end of said hollow body and said side edge slants downward from said inward edge toward said outward edge;

wherein said outward edge fits into said top surface opening of said base portion of the microscope;

such that the adaptor transmits light directly from the objective lens to the camera without changing the light direction.

31. A video microscope system comprising:

a microscope including a base portion having a top surface opening and objective lens;

a video monitor to display an image placed under said objective lens;

a camera including means for connecting to said video monitor; wherein said camera is a closed circuit television camera including a camera chip for transmitting an image placed under said objective lens; and an adaptor consisting essentially of a hollow body portion including open top and bottom ends, said body portion having an interior surface and includes a lens attached to said interior surface, positioned at 8 to 15 mm from said bottom end;

wherein said adaptor has a first means for coupling said top end to said camera and a second means for coupling said bottom end to said top surface opening of said microscope;

said first means includes external screw threads disposed on said top end of said adaptor so that said camera screws into said threads so that said camera chip is located over the opening of said top end of the adaptor;

said second means comprises an open ended frusto-conical section extending from said bottom end of said hollow body;

said frusto-conical section having inward, outward and side edges oriented on said hollow body such that said inward edge extends from said bottom end of said hollow body and said side edge slants downward from said inward edge toward said outward edge;

wherein said outward edge fits into said top surface opening of said base portion of said microscope;

said adaptor transmits light directly from said objective lens to said camera without changing the light direction.

\* \* \* \* \*

UNITED STATES PATENT AND TRADEMARK OFFICE
CERTIFICATE OF CORRECTION

PATENT NO. : 5,521,632
DATED : May 28, 1996
INVENTOR(S) : John O. Simon, Jr.

It is certified that error appears in the above-indentified patent and that said Letters Patent is hereby corrected as shown below:

Col. 3 line 47 after "objects" insert a -- , --.

Col. 4 line 12 after "permit" delete -- ; -- .

In Claim 23, Col. 8 line 67 after "disposed" insert -- on said top end of said adaptor so that said camera screws into said threads. --

In Claim 29, Col. 9 line 28 after "adaptor." delete -- on said top end of said adaptor so that said camera screws into said threads. --

Signed and Sealed this

Sixth Day of August, 1996

*Attest:*

BRUCE LEHMAN

*Attesting Officer*   *Commissioner of Patents and Trademarks*